(12) United States Patent
Pagliasotti

(10) Patent No.: US 8,134,252 B2
(45) Date of Patent: Mar. 13, 2012

(54) CONVERTING WIND ENERGY TO ELECTRICAL ENERGY

(76) Inventor: Robert R. Pagliasotti, Denver, CO (US)

(*) Notice: Subject to any disclaimer, the term of this patent is extended or adjusted under 35 U.S.C. 154(b) by 0 days.

(21) Appl. No.: 13/028,820

(22) Filed: Feb. 16, 2011

(65) Prior Publication Data

US 2011/0133462 A1  Jun. 9, 2011

Related U.S. Application Data

(63) Continuation of application No. 11/974,675, filed on Oct. 15, 2007, now Pat. No. 7,911,075.

(51) Int. Cl.
*F03D 9/00* (2006.01)
(52) U.S. Cl. .......................... 290/55; 52/173.1
(58) Field of Classification Search ............ 52/173.1, 52/1, 234, 236.3, 302.1, 750; 415/2.1, 4.1, 415/4.2, 4.3, 4.4, 4.5, 191, 146, 147, 211.2, 415/224, 905, 907, 908, 909; 60/398; 290/43, 290/44, 45, 54
See application file for complete search history.

(56) References Cited

U.S. PATENT DOCUMENTS

| | | | | |
|---|---|---|---|---|
| 1,872,599 A * | 8/1932 | Le Grand | ...................... | 49/95 |
| 2,501,812 A * | 3/1950 | Fodor | ............................ | 126/67 |
| 3,537,378 A * | 11/1970 | Daly | ............................. | 454/337 |
| 4,004,427 A * | 1/1977 | Butler, Jr. | ....................... | 60/698 |
| 4,098,034 A * | 7/1978 | Howell | ................................ | 52/1 |
| 4,122,675 A * | 10/1978 | Polyak | ............................. | 327/28 |
| 5,394,016 A * | 2/1995 | Hickey | ............................ | 290/55 |
| 6,097,104 A * | 8/2000 | Russell | ............................ | 290/54 |
| 6,201,313 B1 * | 3/2001 | Nakamats | ....................... | 290/54 |
| 6,225,705 B1 * | 5/2001 | Nakamats | ....................... | 290/43 |
| 6,765,309 B2 * | 7/2004 | Tallal et al. | ..................... | 290/55 |
| 6,991,535 B2 * | 1/2006 | Ciepliski et al. | .............. | 454/365 |
| 7,368,828 B1 * | 5/2008 | Calhoon | ......................... | 290/55 |
| 2007/0018462 A1 * | 1/2007 | Richards et al. | ................ | 290/55 |
| 2007/0145160 A1 * | 6/2007 | Martin | ........................ | 236/49.3 |
| 2008/0315592 A1 * | 12/2008 | Branco | ............................ | 290/55 |
| 2010/0084867 A1 * | 4/2010 | Sato | ................................ | 290/52 |

* cited by examiner

*Primary Examiner* — Robert Canfield
*Assistant Examiner* — Babajide Demuren
(74) *Attorney, Agent, or Firm* — Fennemore Craig, P.C.

(57) ABSTRACT

A system for converting wind energy to electrical energy for use in a building. Conduits positioned within the building have end portions open to exterior wall surfaces of the building. Wind deflector mechanisms positioned at the end portions of the conduits direct wind from the exterior wall surfaces of the building into the conduits and allow wind to exit the conduits. Wind flowing through the conduits impacts venturi elements and wind collector devices positioned within the conduits. The venturi elements are pivotally mounted within the conduits to accelerate the wind towards the wind collectors regardless of in which direction the wind flows, thereby causing the wind collectors operatively associated with a wind turbine device to rotate. Wind collector rotation produces mechanical energy that the wind turbine device converts to electrical energy for the building.

15 Claims, 5 Drawing Sheets

CONVERTING WIND ENERGY TO ELECTRICAL ENERGY

CROSS REFERENCE TO RELATED APPLICATION

This application is a continuation of U.S. patent application Ser. No. 11/974,675, filed Oct. 15, 2007 which is incorporated by reference as though fully set forth herein.

BACKGROUND OF THE INVENTION

1. Field of the Invention

The present invention relates generally to devices for converting wind energy to electrical energy and, more particularly, to systems utilizing wind driven turbine generators. Specifically, the present invention relates to systems integrated into buildings which are adapted to capture environmental wind impacting the building and harness its energy for use in generating the power requirements for that building.

2. Description of the Prior Art

In the last several decades, considerable attention has been given to non-petroleum forms of energy generation and in particular to renewable forms of energy. Such renewable energy sources include biomass conversion systems, passive and active solar energy devices, and wind energy driven systems. Wind driven turbines and windmills have been used for centuries to capture energy and generate power. There have been constant efforts to increase the efficiency of and hence the energy production from wind turbines. However, to date it has been very difficult to generate significant energy from wind sources due to inefficiencies of wind turbine devices as well as the lack of prevalent winds on a consistent basis in many geographical locations.

Wind power is one of the most promising and cost-effective renewable energy technologies available today. One advantage of wind power is that even though it is intermittent, it blows both day and night. All 50 U.S. states have sufficient wind to justify wind power turbines. One problem with the present standard wind turbine is that it needs to be located away from populous areas. This is due to the fact that homeowners do not want large blades spinning in their backyards over their heads. Such devices are expensive, large, loud, kill birds and somehow seem dangerous.

Windmill systems utilize wind driven generators having blades that are turned and powered by the passing of airflow from the wind. The first successful attempt in the United States at producing electric power to feed a utility network using large-scale windmills was in Vermont which system utilized a two-bladed windmill mounted on a 150-foot tower. The 175-foot blades were pitch controlled and drove an AC alternator at constant speed. Other examples of such systems utilizing many large-scale windmills can be found in Wyoming and California. Additionally, there have been attempts to erect windmill towers or other central-type power generation systems such as those illustrated in U.S. Pat. No. 969,587 and No. 4,321,476.

Other examples include attempts to incorporate such wind energy systems positioned adjacent large building structures for purposes of creating the necessary power from wind to heat and/or cool such structures, such as illustrated in U.S. Pat. No. 6,041,596 and No. 6,097,104. Such systems require that the building structure itself be designed around the wind generation system, thus affecting and limiting the size and shape of such buildings. Moreover, solar power generators are often coupled with these wind systems since they are not designed to maximize use and capture of wind energy.

Finally, individual residential residences and commercial structures have been modified to incorporate wind and solar energy power systems such as illustrated in U.S. Pat. No. 5,394,016 and No. 6,765,309 in order to generate power for a specific residential or commercial building. Again, a common problem with such systems is the lack of consistent prevalent winds to power the windmill or auger blades. Moreover, significant noise problems can be created by windmill towers in residential neighborhoods as well as unsightly mechanical devices or collectors projecting from the exterior of these structures.

While some of these devices have proven to be effective in converting wind energy to electrical energy, there remains a need for systems which incorporate such wind turbine devices for use in areas where constant prevalent winds may not necessarily be present as well as systems which are adapted for use by individual buildings, including multi-story commercial buildings, for their own power needs. Therefore, there remains a need in the art for such a system or arrangement, and the present invention addresses and solves this particular problem in the art.

BRIEF SUMMARY OF THE INVENTION

Accordingly, it is one object of the present invention to provide a system for capturing and harnessing wind energy efficiently from environmental wind.

It is another object of the present invention to provide such a system that can effectively capture and convert such wind energy as it impacts any of the various exterior surfaces of a building regardless of the direction from which the wind may originate.

Yet another object of the present invention is to provide a system for providing the power needs of a commercial building from wind energy impinging the exterior surfaces of the building wherein such system is integrated into the building structure, itself without creating exterior objects projecting from the building.

Still another object of the present invention is to provide a system for heating and cooling a commercial multi-story building by incorporating wind energy conversion systems into the duct work in between floors of the building so as to be autonomous from the surrounding city power grid without having to add exterior structures to the building design itself.

Another object of the invention is to provide a wind energy conversion system for heating and cooling a commercial multi-story building by incorporating the energy conversion systems into the areas in between floors of the building utilizing space which is presently substantially wasted or inefficient in use.

To achieve the foregoing and other objectives and in accordance with the purpose of the present invention, as embodied and broadly described herein, a system is disclosed for capturing and harnessing energy from environmental wind which impinges the outer wall surfaces of a building. The system includes at least one elongated conduit disposed within an enclosure of a building, the conduit having first and second end portions opening to the building outer wall surfaces. A wind deflector mechanism is disposed at each of the first and second conduit end portions. Each such wind deflector mechanism is adapted to direct environmental wind, which impinges against the building outer wall surface proximate the end portion, into the conduit to provide bi-directional airflow passing through the conduit. At least one wind collector device is disposed within the conduit, and the wind collector has air impact elements mounted to a shaft. Each wind collector device is adapted to interact with the bi-directional airflow moving within the conduit originating from either first or second conduit end portions to rotate the wind collector shaft. Finally, a wind turbine device is disposed within the building and is operatively interconnected to the wind collector shaft to generate electricity from the rotation thereof.

In one modification of the invention, each wind deflector mechanism includes air inlet elements which are adapted to capture environmental wind originating from one or more directions exterior to the outer surface of said building at the conduit end portion, and to deflect the captured wind into the conduit to create an axial airflow therein, the air inlet elements of the opposite conduit end portion being adapted to exhaust the axial airflow after passing through the conduit.

In modification of this invention, the system further includes venturi elements disposed within the conduit which are adapted for accelerating airflow into the conduit. In one form of this, the venturi elements are pivotally mounted within the conduit between an inward orientation adapted to accelerate wind directed into the conduit by the deflector mechanism, and an outward orientation adapted to permit wind to freely exit the conduit.

In yet another modification, each wind turbine device includes a generator which is adapted to provide electric energy for purposes of powering the heating and cooling systems of the building, the generator being disposed proximate to the conduit.

In one form of this modification, the system includes a plurality of the conduits disposed within a building, with the wind collectors and wind turbine devices thereof being adapted to all provide electric energy to power the heating and cooling systems of the building. In one aspect of this, a plurality of the conduits are aligned substantially parallel with each other and disposed between adjacent floors of the building. In still another modification of the invention, the system includes a plurality of such conduits, wherein the building enclosing these conduits includes a plurality of outer wall surfaces with the conduits being aligned such that each building wall surface includes at least one conduit end portion with its wind deflector mechanism exposed to the environmental wind impinging the building outer wall surface proximate thereto.

In another modification of the invention, a building-integrated system is disclosed for providing power needs of a building generated from wind energy impacting the exterior surfaces of the building. The system includes at least one elongated substantially hollow airflow conduit having first and second end portions and which extends through the building between opposite outer wall surfaces thereof. A wind deflector mechanism is disposed at each conduit end portion. Each wind deflector mechanism has omni-directional air inlet elements adapted to capture environmental wind originating from plural compass directions and impacting the building exterior surface proximate the end portion, the air inlet elements deflecting captured wind into the conduit to create a substantially axial airflow therein. Airflow turbulence control elements are disposed within the conduit to create substantially laminar airflow along the length thereof. A plurality of wind collector devices are disposed within the conduit with each having air impact elements mounted to a shaft. Each wind collector is adapted to interact with the axial airflow moving within the conduit originating from either the first or second conduit end portions to rotate the wind collector shafts. Finally, a wind turbine device is disposed within the building and is operatively connected to the wind collector shafts to generate electricity from the rotation thereof.

Yet another modification includes a system for providing energy to heat and cool a multi-story building by capturing the energy from wind impinging the exterior surfaces of the building. The system includes a plurality of elongated airflow conduits extending through the building between opposite exterior wall surfaces thereof. The conduits are disposed between adjacent floors of the multistory building with each conduit having first and second end portions open to the building exterior wall surfaces. A wind deflector mechanism, in the form of a plurality of air inlet elements, is disposed at each conduit end portion and is adapted to capture environmental wind impacting the building exterior surface proximate the end portion. The air inlet elements deflect captured wind into the conduit to create a substantially axial airflow therein. Airflow turbulence control elements are disposed within the conduit to create substantially laminar airflow along the length thereof. At least one wind collector device is disposed within each conduit with each wind collector device having air impact members mounted to a shaft for interacting with the axial airflow moving within the conduit originating from either first or second conduit end portions to rotate the wind collector shafts. At least one wind turbine device is disposed proximate the conduit and is operatively interconnected with the wind collector shafts for generating electricity therefrom for use in heating and cooling the airspace in rooms located in adjacent floors of the multi-story building. Finally, an airflow direction sensing element is disposed within each conduit for determining the direction of the axial airflow within the conduit based on the direction of environmental wind impacting the building exterior surfaces, the sensing element opening the air inlet elements at the first and second end portions accordingly.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE INVENTION

Referring first to FIGS. 1-6, a multi-story commercial building 10 is illustrated with a plurality of ducts or conduits 12 enclosed therein. It should be understood that the present invention may be used with any type of residential or commercial building, single or multi-story, for the purposes of providing energy for heating or cooling thereof by capturing and converting the energy from environmental wind impinging upon the exterior surfaces 14 of such structures. When there is a prevailing wind direction relative to the building's design or orientation, then the components of the invention may be oriented and designed relative to the building's exterior wall surfaces in a manner different from situations where the wind is frequently multi-directional, although the present invention may be efficiently applied and utilized in any such situations.

Figure 5:
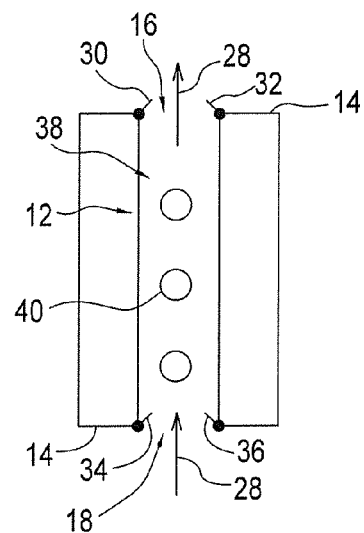
FIG. 5 is a detailed schematic similar to that of FIG. 4 but illustrating the wind originating from an opposite direction relative to the exterior surfaces of a building.

More specifically, the invention includes at least one such conduit 12 disposed within building 10. Each conduit 12 preferably includes a first end portion 16 and second end portion 18, which open to opposite exterior surfaces 14 of building 10. The conduits 12 preferably include wind deflector mechanisms 24 at the first and second end portions (16, 18) thereof for the purpose of directing environmental wind impinging against the exterior surfaces 14 of building 10 (proximate said first and second end portions (16, 18)) into said conduit 12 to provide axial airflow passing through said conduit 12 in either direction depending on the prevailing winds impinging building 10. In one illustrated embodiment, the first wind direction 26 causes the axial low to move from the first end portion 16 to the second end portion 18 (FIG. 4), while the second wind direction 28 causes the axial airflow in conduit 12 to move in the opposite direction from the second end portion 18 to the first end portion 16 (FIG. 5).

Figure 3:
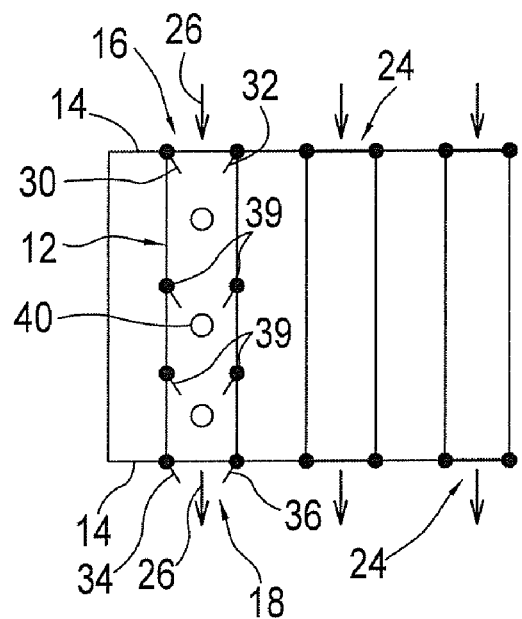
FIG. 3 is a schematic illustration of another embodiment of the invention but illustrating a plurality of conduits disposed along one building level.
Figure 4:
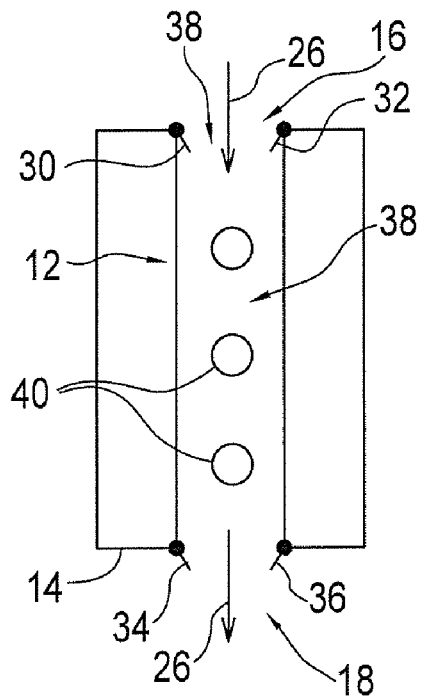
FIG. 4 is a detailed alternate schematic of an embodiment of the invention with the wind impacting one wall surface of a building structure.

The wind deflector mechanisms 24 may be constructed in any desired form to accomplish the desired purpose. In one preferred embodiment, the wind deflector mechanisms 24 have air inlet elements in the form of a first pair of pivotally mounted louver fins (30, 32) at the first end portion 16 and a second pair of pivotally mounted louver fins (34, 36) at the second end portion 18. When the wind moves in the first wind direction 26, the first pair of louver fins (30, 32) open inwardly into the conduit 12 so as to form a venturi channel 38 to assist in directing wind into the conduit 12, as well as accelerating and controlling turbulence of the axial airflow therein. The second pair of louver fins (34, 36) are forced outwardly away from the conduit 12 so as to permit the airflow to more readily exit the conduit 12, see FIG. 4. When the prevailing wind moves in the second wind direction 28, then the first pair of louver fins (30, 32) open outwardly and second pair of louver fins (34, 36) open inwardly, see FIG. 5. Thus, the laminar airflow created within the conduit 12 may be bidirectional depending on the winds impinging the exterior surfaces 14 of building 10. In addition, as illustrated in FIG. 3, a plurality of pivotal airflow turbulence control elements such as venturi elements 39 may be spaced along the interior of the conduit 12 to assist in creating the laminar flow therein.

Figure 6:
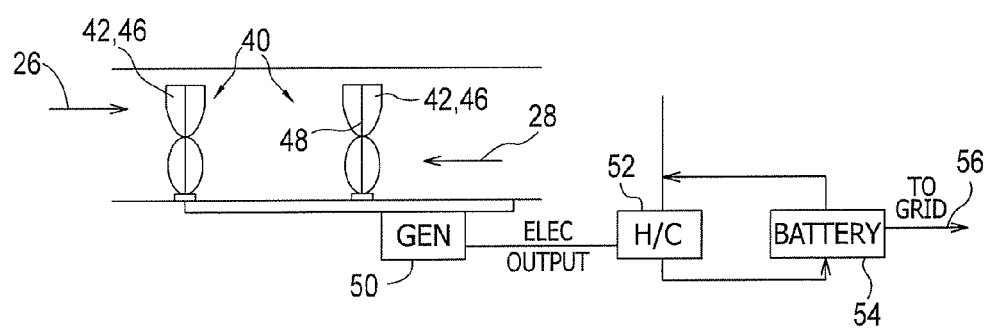
FIG. 6 is an enlarged schematic illustration of an embodiment as constructed in accordance with the present invention and illustrating wind collectors which may be utilized in the invention.

At least one, and preferably a plurality of, wind collectors 40 are disposed in the conduits 12 so as to project into the path of the laminar airflow created therein. While the wind collectors 40 may be of any desired design, they each preferably include a plurality of wind impact elements such as propellers 42. In one preferred embodiment as illustrated in FIG. 6, the wind collectors 40 are in the form of helically shaped blades 46 mounted to a shaft 48 and aligned substantially vertically within the conduit 12 relative to the airflow therein. In this manner, the wind collectors 40 may be rotated along their shafts 48 regardless of the direction of the airflow within the conduit 12. The shafts 48 of the wind collectors 40 are then operatively interconnected to wind turbine devices 47 (e.g., generator devices 50) as known in the art, so as to create wind generators.

The generator devices 50 create electrical energy that is then used directly in the heating and cooling systems 52 of the building 10 housing the conduit 12. Should the building 10 needs be such that the generator devices 50 are creating more energy then is needed at any one particular time, then the excess energy may be preferably stored in one or more storage batteries 54 for use at later times when needed. In addition, should the storage batteries 54 be at capacity, then the excess energy may be directed back into the electric grid 56 for payment by the utility industry. It should be understood that the generator devices 50 may be disposed proximate the conduits 12 or they may be positioned remotely in the basement of the building 10 as illustrated in FIG. 1.

Figure 1:
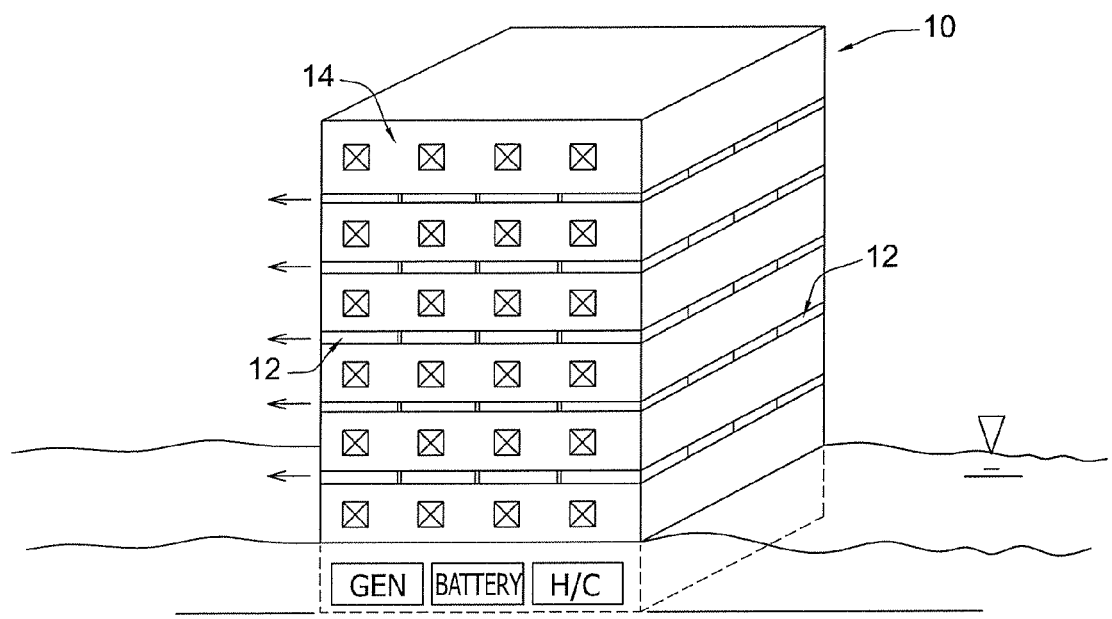
FIG. 1 is a front perspective view of a multi-story commercial building incorporating the present invention therein.
Figure 2:
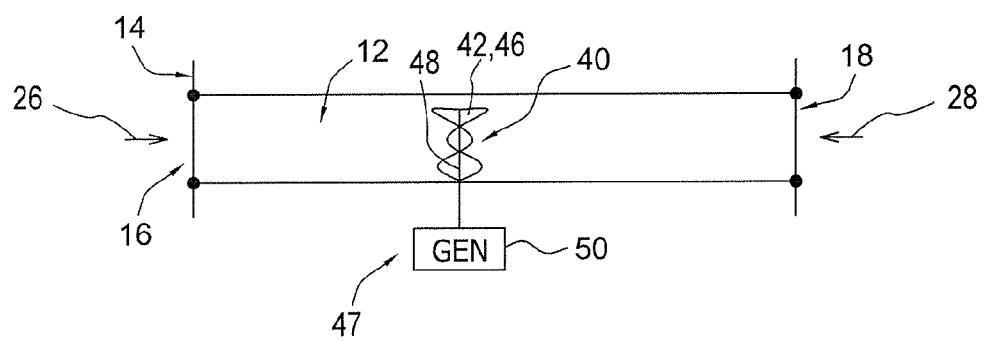
FIG. 2 is a side schematic illustration of one conduit embodiment constructed in accordance with the present invention.

In one preferred form of the invention as illustrated in FIG. 1, the conduits 12 are preferably aligned substantially parallel and adjacent to each other in the ductwork between floors of building 10. In this manner a substantial number of wind collectors 40 and associated generator devices 50 may be operatively interconnected to generate substantial amounts of electrical energy without any noticeable units or hardware projecting outwardly of the exterior surfaces 14 of building 10, as is the case of many prior art designs. This design also permits efficient use of the duct space that typically exists between floors in multi-story commercial buildings like building 10. In the instance where the prevailing environmental wind is substantially uniform from one direction, then the arrangement illustrated in FIG. 1 is most efficient. However, in those instances where the wind may originate from any number of different directions, as is often the case in windy cities such as Chicago and Seattle, the design of FIG. 7 is optimal.

Figure 7:
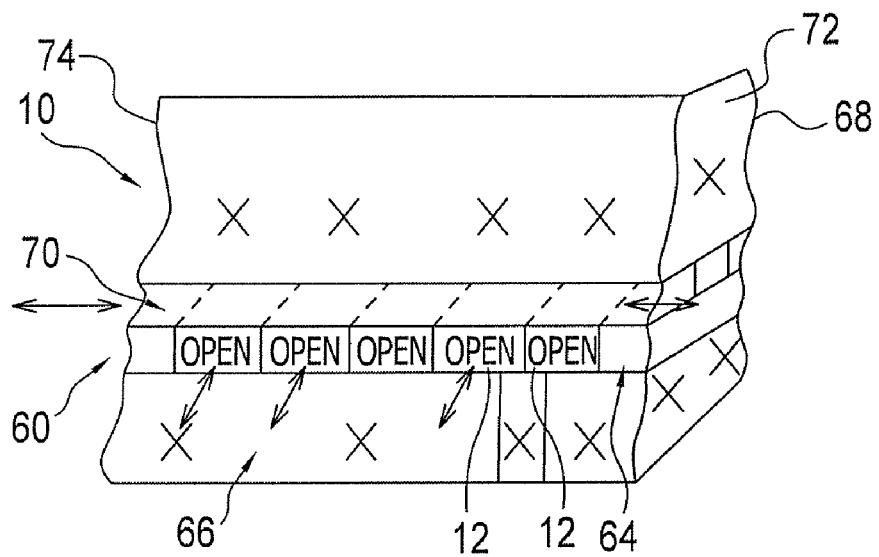
FIG. 7 is a schematic illustration of yet another embodiment as constructed in accordance with the present invention.

Referring now to FIGS. 1 and 7, an assembly 60 of conduits 12 may be interposed between adjacent floors of building 10. In this arrangement, the assembly 60 includes a first set 64 of substantially parallel conduits 12 mounted next to each other and aligned to open onto opposite building wall surfaces (66, 68), while a second set 70 of similar substantially parallel conduits 12 are disposed immediately above the first set 64 of conduits 12. The second set 70 of conduits 12 are oriented to and aligned to open onto opposite building wall surfaces (72, 74). In this manner, regardless of the direction of the environmental winds, the conduit assembly 60 may capture and convert the energy thereof for use in meeting the energy needs of building 10. Moreover, this arrangement may also include a plurality of such assemblies with one being disposed between each set of adjacent floors of building 10.

Figure 8:
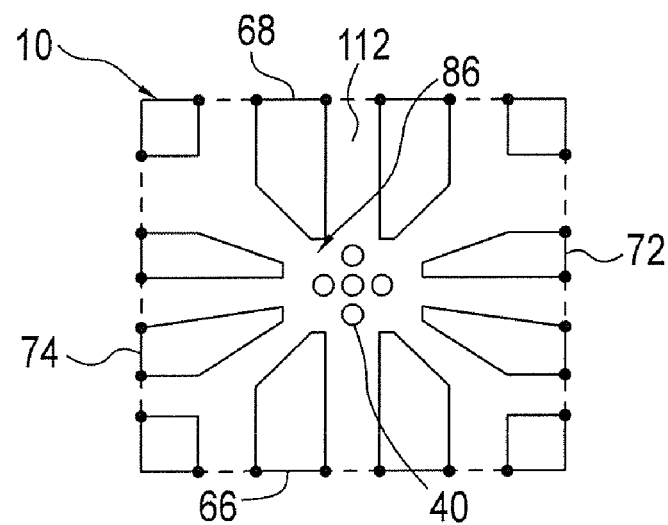
FIG. 8 is a top sectional schematic of yet another embodiment of the present invention incorporated into the building design of a commercial building structure.

Referring now to FIG. 8, another embodiment of the present invention is illustrated. In this embodiment, building 10 includes a plurality of conduits 112 opening to each of the exterior wall surfaces (66, 68, 72, and 74). In this arrangement, the conduits 112 are disposed between floors of building 10 and operate similarly to the above-described conduits 12. However, in this embodiment, the conduits 112 all open into a central area 86 wherein the wind collectors 40 are disposed. In this manner, any wind impinging the exterior wall surfaces (66, 68, 72, and 74) is directed into the conduits 112 in the form of airflow into the central area 86 to operate the wind collectors 40 and their associated wind generator devices 50, previously described. The airflow may exit from the central area 86 along any route which is not receiving input airflow, since there will be a reduced air pressure along the end portions of the conduits 112 which are not receiving impacted environmental wind.

Figure 9:
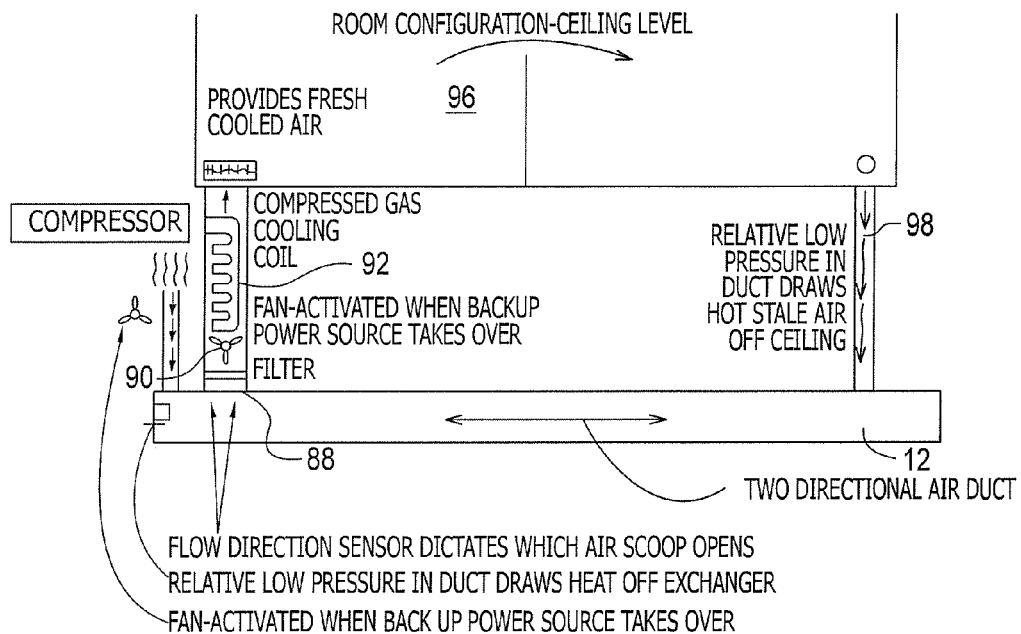
FIG. 9 is a schematic of another embodiment constructed in accordance with the present invention.
Figure 10:
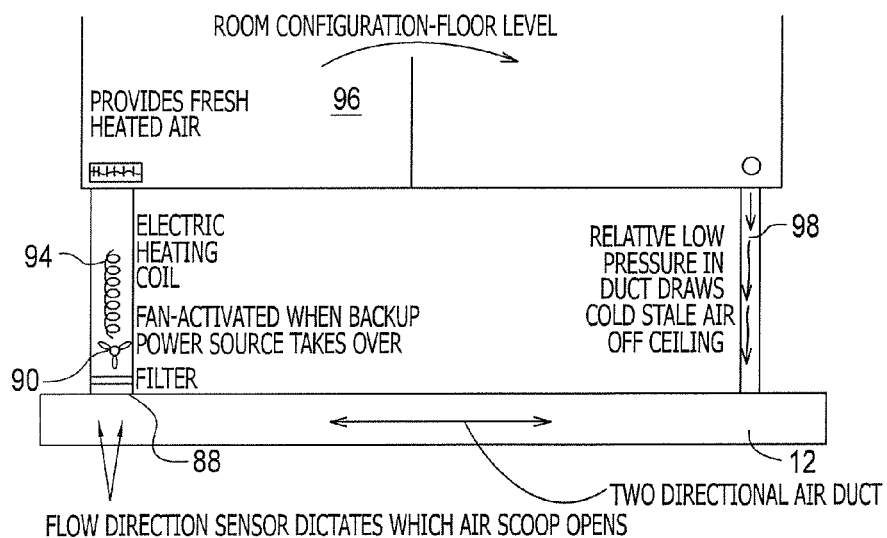
FIG. 10 is a schematic of still another embodiment similar to that of FIG. 9 as constructed in accordance with the present invention.

Referring now to FIGS. 9 and 10, yet another embodiment of the invention is illustrated. In this embodiment, the conduits 12 operate as in the previous embodiments. In the embodiments of FIGS. 9 and 10, however, flow detection sensors 88 are provided to determine the direction of the laminar airflow within the conduit 12 and whether there is even any airflow at all. When there is an absence of airflow in the conduits 12 due to a lack of environmental wind, an impeller device 90 is operated from an outside power source or from stored battery energy to draw air through the conduit 12 and past an air cooling mechanism 92 or an air heating mechanism 94 to provide, respectively, cooled or heated air to the rooms 96 of the floor adjacent to the conduit 12. A return duct 98 interconnects the rooms 96 with the conduit 12 such that axial airflow within the conduit 12 created by natural wind impact or the impeller device 90 creates a low pressure center to circulate air out from the rooms 96 and through the conduits 12 to exit building 10.

The concept of the present invention is particularly useful for installation in average single-family homes or in use with commercial buildings. In any of the described embodiments, the present invention takes up virtually no ground space and can be integrated into new building designs without utilizing significant work space. The present invention can also be constructed to blend in more with the environment and building structures. In preferred form, the invention is omni-directional in that it has a 360-degree view of environmental wind impacting the exterior wall surfaces (66, 68, 72, and 74) of building 10 and therefore can handle wind from any one direction or from multiple directions. The interior airflow feature of the invention allows it to handle high winds without any negative effect and can in fact work effectively and efficiently in high wind areas. It can also handle substantial wind gusts and has an airflow anti-turbulence feature which further increases the performance of the invention.

As can be seen from the above, the present invention provides a system for capturing and harnessing environmental wind energy in an effective and efficient manner. The present invention eliminates prior art unsightly and noisy windmill systems or building augmentation arrangements previously used. Moreover, the present invention provides a system that is adaptable for use with individual residential structures or multi-story commercial building structures and may be integrated into a new structure or added onto an existing structure without significant loss of work space. The invention is designed to operate even at times of high, gusty winds unlike some prior wind power devices which automatically shut down during such situations. Additionally, the present invention is designed to be easily maintained. Finally, the present invention provides an efficient, inexpensive and practical alternative for generating energy from a renewable energy resource while providing substantially all of the energy needs of a building immediately or from storage.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

What is claimed is:

1. A system for converting wind energy to electrical energy for a building, comprising:
   a conduit positioned within the building, the conduit having first and second end portions open to outer wall surfaces of the building;
   a wind collector positioned within the conduit, the wind collector being configured to rotate as air flowing through the conduit impacts the wind collector;
   a wind deflector mechanism positioned at the first and second end portions of the conduit, the wind deflector mechanism having an inward position to accelerate wind towards the wind collector and an outward position to allow wind to exit the conduit;
   a plurality of venturi elements pivotally mounted within the conduit, the plurality of venturi elements having first and second positions to accelerate wind towards the wind collector and being configured to allow for bi-directional airflow within the conduit such that the first position accelerates wind towards the first end portion of the conduit and the second position accelerates wind towards the second end portion of the conduit; and
   a wind turbine device operatively connected to the wind collector to generate electrical energy for the building from the rotation of the wind collector.

2. The system of claim 1, wherein the wind deflector mechanism comprises louver fins.

3. The system of claim 1, wherein the venturi elements comprise louver fins.

4. The system of claim 1, further comprising an airflow direction sensing element positioned within the conduit, the airflow direction sensing element being operatively associated with the wind deflector mechanism to control the position of the wind deflector mechanism between the inward and outward positions.

5. The system of claim 1, wherein the conduit comprises a plurality of conduits aligned substantially parallel with each other and positioned between adjacent floors of the building.

6. The system of claim 1, wherein the conduit comprises a plurality of conduits positioned within the building, the plurality of conduits having a commonly shared portion.

7. The system of claim 1, wherein the wind collector comprises an air impact element and a shaft, the air impact element being connected to the shaft.

8. The system of claim 1, further comprising a battery operatively connected to the wind turbine device and the building, the battery being configured to store excess electrical energy generated from the wind turbine device and provide the electrical energy to the building.

9. A system for converting wind energy to electrical energy for a building, comprising:
   a plurality of conduits positioned within the building, each conduit having first and second end portions open to outer wall surfaces of the building;
   a wind deflector mechanism comprising air inlet elements positioned at the first and second end portions of the conduits, the air inlet elements having an inward position to direct wind into the end portions of the conduits and an outward position to allow wind to exit the end portions of the conduits;
   a wind collector positioned within the conduits, the wind collector comprising air impact members connected to a shaft being configured to rotate as air flowing through the conduits impacts the air impact members;

a plurality of venturi elements comprising louver fins pivotally mounted within the conduits, the louver fins having first and second positions to accelerate wind towards the wind collector and being configured to allow for bi-directional airflow within the conduit such that the first position accelerates wind towards the first end portions of the conduits and the second position accelerates wind towards the second end portions of the conduits; and a wind turbine device operatively connected to the shaft of the wind collector and building, the wind turbine device being configured to generate electrical energy from the rotation of the shaft and provide the electrical energy to the building.

10. The system of claim 9, wherein the plurality of conduits have a commonly shared portion.

11. The system of claim 9, wherein the plurality of conduits are aligned parallel with each other and positioned between adjacent floors of the building.

12. The system of claim 9, further comprising a battery operatively connected to the wind turbine device and the building, the battery being configured to store excess electrical energy generated from the wind turbine device and provide the electrical energy to the building.

13. The system of claim 9, further comprising an airflow direction sensing element positioned within the conduits, the airflow direction sensing element being operatively associated with the air inlet elements of the wind deflector mechanism to control the position of the air inlet elements between the inward and outward positions.

14. The system of claim 9, further comprising an impeller apparatus operatively associated with the conduits, the impeller apparatus selectively creating airflow within the conduits in the absence of wind impacting the building exterior wall surfaces.

15. The system of claim 9, wherein the conduits connect to rooms within the building, the airflow within the conduits creating a low pressure to circulate air out of the rooms and through the conduits to exit the building.

* * * * *